United States Patent [19]
Gerhardt

[11] Patent Number: 5,373,758
[45] Date of Patent: Dec. 20, 1994

[54] DEVICE FOR PUNCHING SHEET-TYPE MATERIAL, IN PARTICULAR LABEL MATERIAL

[76] Inventor: Joergen Gerhardt, 3, Kirstinehoej, DK-2770 Kastrup, Denmark

[21] Appl. No.: 26,113

[22] Filed: Mar. 1, 1993

Related U.S. Application Data

[63] Continuation of Ser. No. 483,806, Feb. 23, 1990.

[30] Foreign Application Priority Data

Feb. 28, 1989 [DE] Germany .................. 3906290

[51] Int. Cl.⁵ .................................................. B21K 5/20
[52] U.S. Cl. ................................................... 76/107.8
[58] Field of Search .................................... 76/107.8

[56] References Cited

U.S. PATENT DOCUMENTS

| | | | |
|---|---|---|---|
| 2,863,337 | 12/1958 | Ackley | 83/665 X |
| 3,302,490 | 2/1967 | Bishop | 83/665 X |
| 3,577,822 | 5/1971 | Sauer et al. | 83/659 |
| 3,789,715 | 2/1974 | Schiechardt et al. | 83/669 |
| 3,850,059 | 11/1974 | Kang | 83/669 X |
| 3,937,109 | 2/1976 | Korner et al. | 83/669 X |
| 3,965,786 | 6/1976 | D'Luhy | 83/659 X |
| 4,187,752 | 2/1980 | Chesnut | 83/663 |
| 4,625,612 | 12/1986 | Oliver | 83/863 |
| 4,694,672 | 9/1987 | Baughman | 72/53 |
| 4,934,231 | 6/1990 | Chesnut et al. | 83/343 |

FOREIGN PATENT DOCUMENTS

| | | |
|---|---|---|
| 989659 | 9/1951 | France . |
| 2852521 | 6/1979 | Germany . |
| 2133734 | 9/1984 | United Kingdom . |

OTHER PUBLICATIONS

Harold Kaufmann, *Machine Design*, vol. 46, No. 29, 28 Nov. 1974, Cleveland US Seiten 69-71: "Two-Roll Forming for Improved Speed and Precision", Seite 71, rechte Spalte, Zeilen 30-38.

Kopp & Hornauer, *Metall*, vol. 34, No. 4, Apr. 1980, Berlin & Heidelberg, Seiten 320-323; "Kugelstrahl-Umformen und-Richten", Seite 322, rechte Spalte, Zeilen 61-64; Figuren 13A, 13B.

*Primary Examiner*—James G. Smith
*Attorney, Agent, or Firm*—Foley & Lardner

[57] ABSTRACT

A device for punching sheet-type material, in particular label material, includes a sleeve which encloses a supporting roller in a press fit manner. The sleeve is bent from a flat steel sheet having mutually facing edges which are joined to each other and having an external surface which is provided with punching bridges formed by etching the steel sheet. The bridges are preferably sharpened in a knife-like fashion.

19 Claims, 10 Drawing Sheets

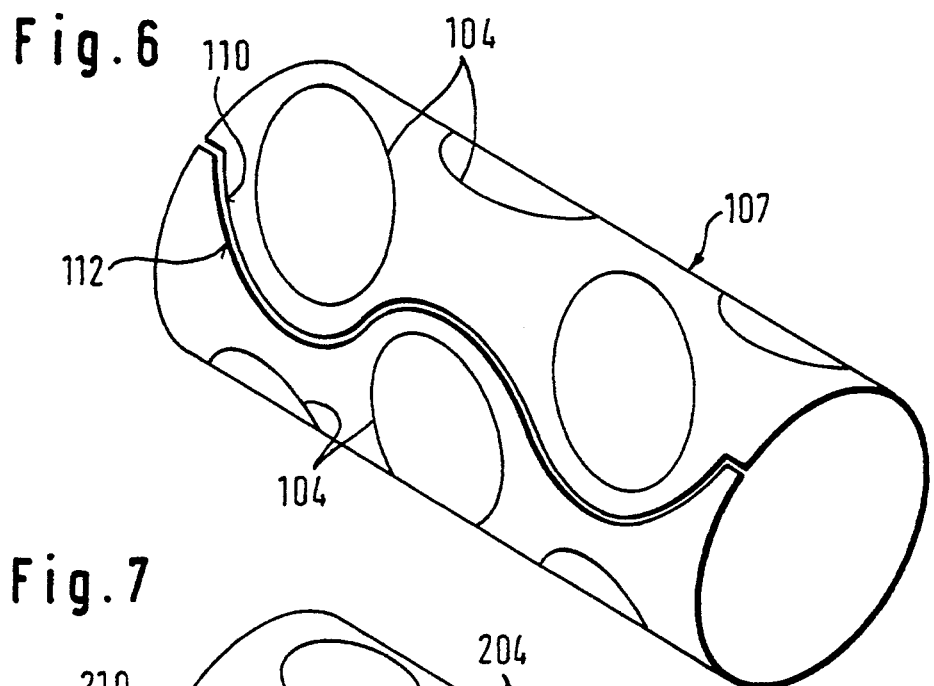
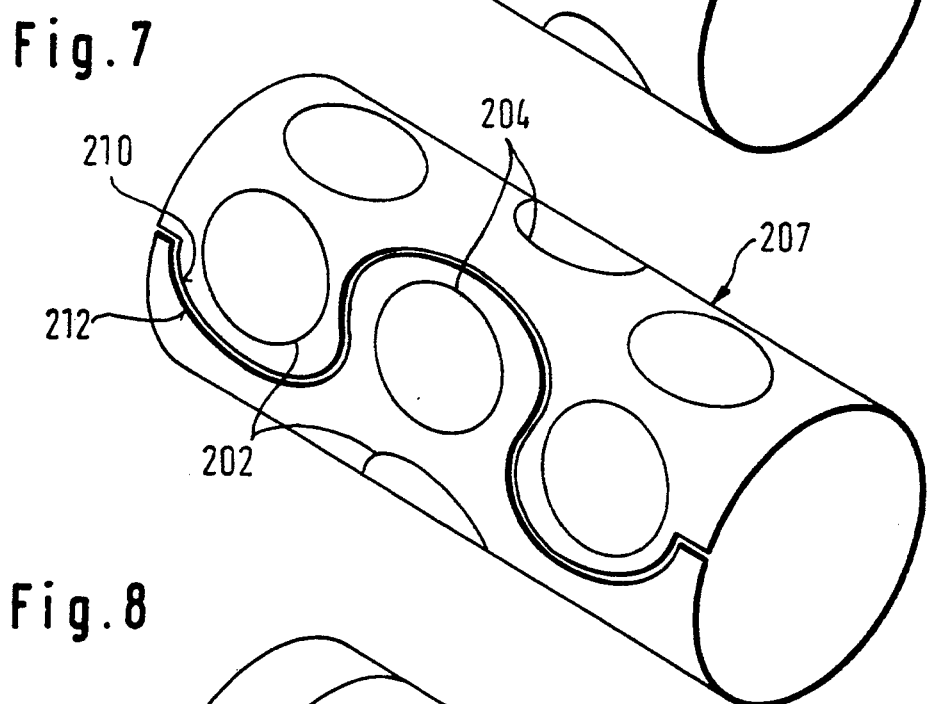
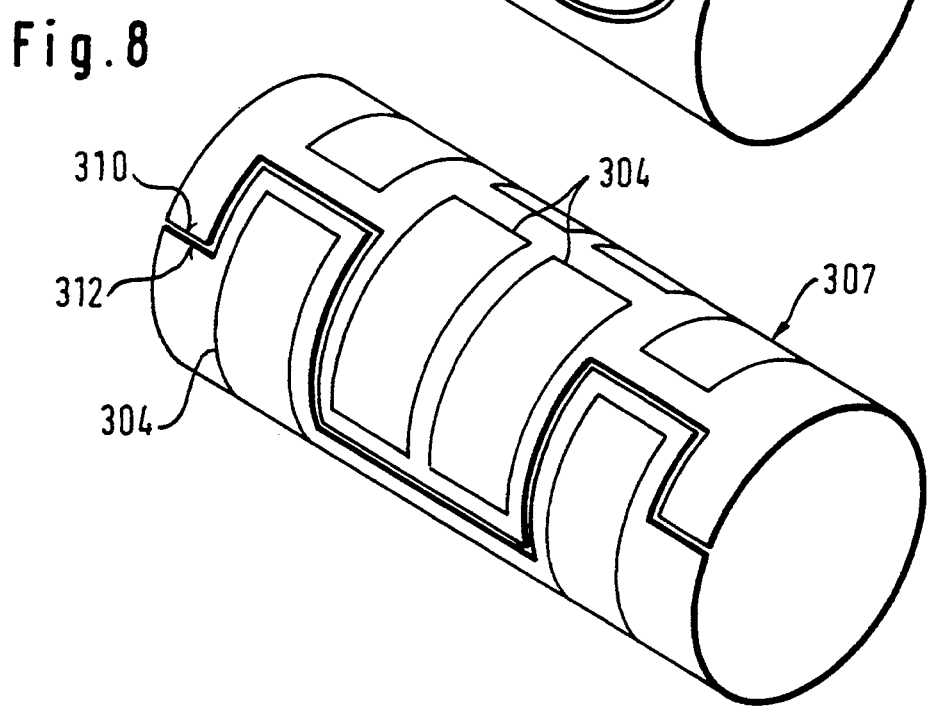

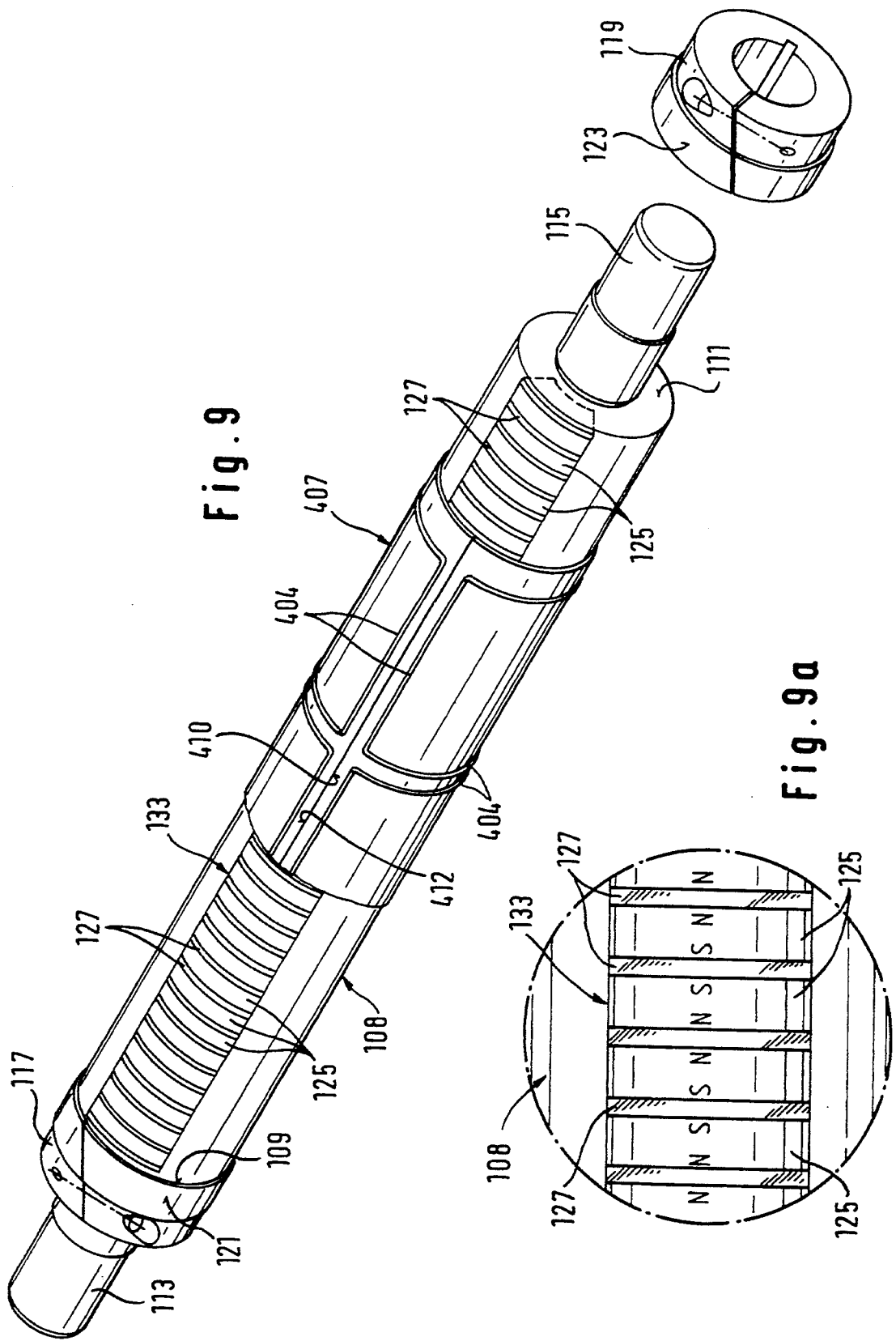

DEVICE FOR PUNCHING SHEET-TYPE MATERIAL, IN PARTICULAR LABEL MATERIAL

This application is a continuation of application Ser. No. 07/483,806, filed Feb. 23, 1990.

BACKGROUND OF THE INVENTION

The invention relates to device for punching sheet-type material, in particular label material.

SUMMARY OF THE INVENTION

The object of the invention is to provide a device of this type which can be produced at little expense and permits a wide variety of uses.

A further object of the invention is to provide a procedure for producing such a device, and a device for carrying out this procedure.

In accomplishing the foregoing objects, there has been provided according to one aspect of the present invention a sleeve which is bent from a flat steel and includes mutually facing edges and an external surface. This sleeve encloses a supporting roller as a press fit and the mutually facing edges are joined to each other and the external surface is provided with punching bridges formed by etching the steel sheet and preferably sharpened in a knife fashion. The bridges are ridges which are outwardly projecting from the external surface of the sleeve.

In accordance with another aspect of the invention there has been provided a procedure for producing a device for punching sheet-type material which comprises the steps of pushing a flat steel sheet provided with the punching bridges over a replaceable backing cylinder, which revolves in a housing on a revolving driving roller from one side of said backing cylinder and blasting the steel sheet from above essentially radially to the backing cylinder with a particle jet which moves back and forth in the axial direction of the backing cylinder.

Further objects, features and advantages of the present invention will become apparent from the detailed description of preferred embodiments which follows, when considered together with the attached drawings.

BRIEF DESCRIPTION OF THE DRAWINGS

FIGS. 6, 7 and 8 show embodiments of sleeves whose mutually facing edges have been matched to the shape of the punching bridges.

FIG. 9 shows an advantageous embodiment of the cylinder.

FIG. 9a shows an enlargement of a region of the strip of the cylinder as shown in FIG. 9, which strip is magnetized with alternating poles.

DETAILED DESCRIPTION OF THE PREFERRED EMBODIMENTS

Figure 1:
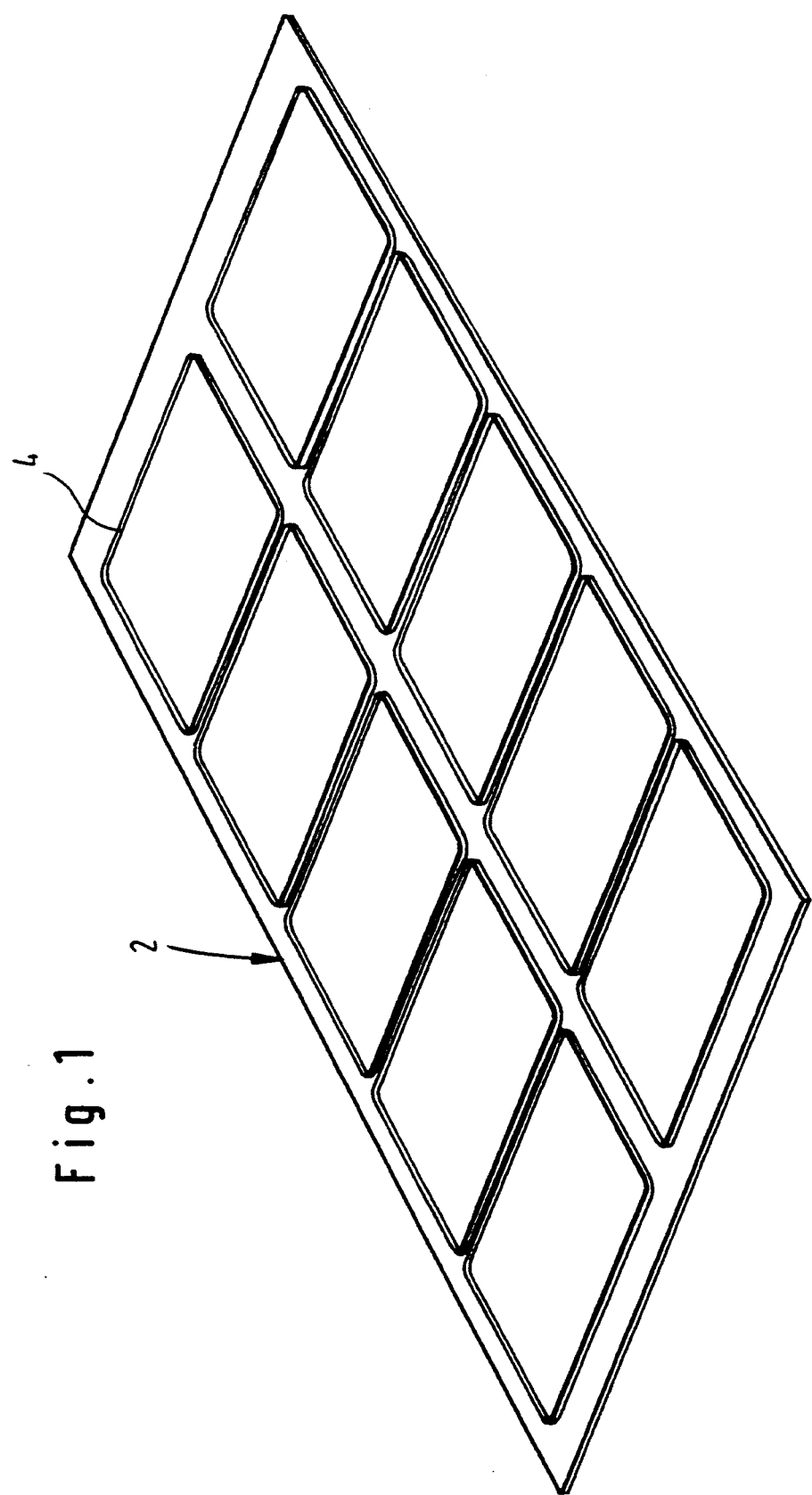
FIG. 1 shows a steel sheet having punching bridges before it is bent to form a sleeve.

In applying the present invention, the supporting roller may be composed of commercial-type steel. The sleeve provided with the punching bridges can be replaced; in doing this, the supporting roller does not therefore have to be replaced.

Preferred materials for the steel sheet of the sleeve have the grade C 67 according to DIN 17 222/1544 P and a thickness of 0.35 to 1.2 mm, preferably 0.4 to 1.1 mm. In order to hold the sleeve firmly on the supporting roller it is preferred to provide a cylinder as support for the sleeve which has at least section-wise a magnetized circumferential surface and whose outside diameter is essentially equal to the inside diameter of the sleeve.

In order to obtain a sleeve which is circumferentially as continuous as possible, an embodiment is preferred wherein the sleeve encloses the cylinder except for a slit between its mutually facing edges of 0.02 to 0.05 mm.

In order that the sleeve bent from the steel sheet retains its shape, the procedure is preferred wherein the surface measurement of the outside of the sleeve is increased compared with the surface measurement of the inside of the sleeve by a surface treatment of the outside of the sleeve. In particular a procedure is preferably adopted wherein the surface treatment is a particle jet treatment, preferably a sand or glass particle jet treatment.

In order to close the sleeve, a procedure is preferred wherein the mutually facing edges of the sleeve are welded together at least at their ends—preferably butt-welded with an externally situated weld.

In order to achieve a matching of the mutually facing edges of the sleeve to the shape of the punching bridges, an embodiment is preferably provided wherein the mutually facing edges of the sleeve are curved to match the shape of the punching bridges.

In order to simplify the production of the cylinder, an embodiment is preferably provided wherein the cylinder is magnetized on its circumferential surface only along an axial strip.

In order to hold the punching bridges at a specified distance from the sheet-type material to be punched, an embodiment is preferably provided wherein the end faces of the cylinder are adjoined by bearing journals and wherein a raceway having a circumferential surface which projects somewhat over the punching bridges is mounted on the inner end of at least one bearing journal.

To produce the sleeves, a procedure has proved particularly satisfactory in which a flat steel sheet provided with the punching bridges is pushed over a replaceable backing cylinder, which revolves in a housing on a revolving driving roller, from one side of said backing cylinder and the steel sheet is blasted from above essentially radially to the backing cylinder with a particle jet which moves back and forth in the axial direction of the backing cylinder. In this procedure, only the backing cylinders have to be replaced to match the diameter of the sleeves to be produced. The curving of the steel sheet to the sleeve shape is effected by the particle jet.

In order to obtain a uniform conveyance of the steel sheet over the top of the backing cylinder, a device for carrying out the procedure is preferred wherein a feed clamping line is situated in the housing next to the top of the backing cylinder between two feed rollers for the steel sheet which are driven synchronously with the backing cylinder.

In order to be able to introduce the steel sheet into the housing in a simple manner, an embodiment of the device is preferred wherein the housing has, at the level of the feed clamping line, a feed opening for the steel sheet into which the steel sheet is to be fed by means of a conveying device arranged outside the housing on the housing.

In order to be able to use the particles of the particle jet repeatedly, an embodiment is preferred wherein the housing has a collecting chamber for the particles of the particle jet and wherein a suction line for the particles originates from said collecting chamber, which suction line opens into a nozzle which is supplied with compressed air, is moved back and forth in the axial direction of the backing cylinder and produces the particle jet.

In order to remove dust from the housing, an embodiment is preferred wherein at least one suction line is led from the housing above the collecting chamber which suction line terminates in a suction appliance provided with a dust filter.

In order to be able to press the steel sheet against the backing cylinder during the blasting with particles, an embodiment is preferred wherein a hold-down device which can be lowered and raised to press the steel sheet against the top of the backing cylinder is arranged in the housing above the backing cylinder.

The invention is described below on the basis of an exemplary embodiment with reference to the accompanying drawings.

FIG. 1 shows a steel sheet 2 made of a spring steel of grade C 67 according to DIN 17 222/1544 P.

The steel of this steel sheet has the following composition:

C 0.65–0.72 P not more than 0.045
Si 0.15–0.35 S not more than 0.045
Mn 0.60–0.90 Cr about 0.20

Sheet thicknesses between 0.44 mm and 0.63 mm have now proved particularly satisfactory. In general, however, sheet thicknesses from 0.35 to 1.2 mm, in particular 0.4 to 1.1 mm, are preferred.

The hardness of the steel sheet is between Rockwell C 45 and Rockwell C 54.

The steel sheet 2 is first cut into the outline form shown in FIG. 1 and then brushed down on both sides with water.

Then the steel sheet is again brushed down with water. For this purpose, finer brushes are used than for the first time.

After that, the steel sheet 2 is heated, for example to 125° C.

Then a photographic emulsion which is resistant to etching after exposure is deposited on the steel sheet 2 and heated for the purpose of hardening, for example to 110° C.

Then the emulsion is exposed using a pattern which corresponds to the punching bridges 4 to be formed. The regions of the emulsion which correspond to the punching bridges 4 thereby become immune to attack by an etchant.

Then the steel sheet 2 is heated again, for example to 110° C.

Then the emulsion is treated with an etchant, as a result of which the steel sheet 2 becomes thinner with the exception of the region of the punching bridges 4.

Then the etch-resistant emulsion adhering to the punching bridges 4 is removed.

Then the required precise dimensions are given peripherally to the steel sheet 2 and the punching bridges 4 are sharpened in knife fashion.

Figure 2:
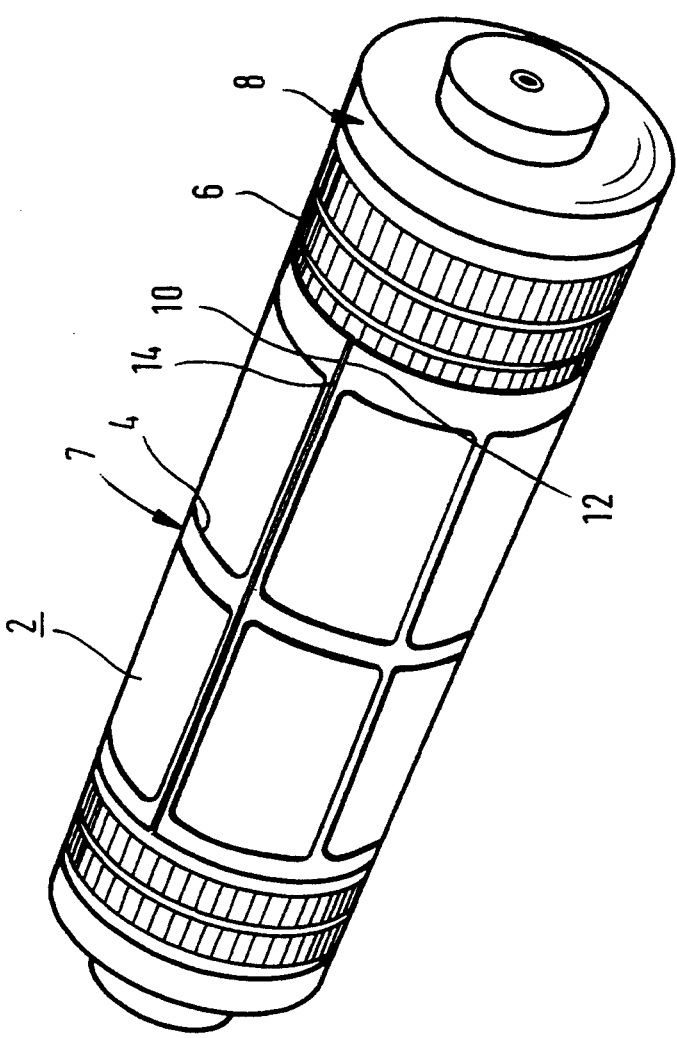
FIG. 2 shows a steel sheet as shown in FIG. 1 bent around a magnetized circumferential surface of a cylinder.

FIG. 2 shows a commercial-type cylinder 8 which is provided with a magnetized circumferential surface 6 and around which the steel sheet 2 having the punching bridges 4 formed on it is bent. Between the mutually facing edges 10, 12 of the steel sheet 2 is a slit 14 of width 0.02 to 0.05 mm (can be seen better in FIG. 3). Preferably, the particles in the jet or particles are composed of soda lime glass of the following specification:

Type AH screen mesh size: 106, 90, 45 PAN shape (round) in $\mu$m

Screen residue: 0 to 2, 0 to 10, 80 to 100, 0 to 20%

Roundness: 85%

Particle size distribution: not less than 80% by weight smaller than the smallest screen mesh size; not more than 10% by weight larger than the larger mesh sizes (B.S. 6088 test)

Iron content: not more than 0.1% by weight

Silicon dioxide content: not less than 67% by weight (B.S. 6088 test)

Specific gravity: 2.45 to 2.55 g/cm$^3$

Hardness: Rockwell C 48 to Rockwell C 50

Color: Clear or crystalline, free of surface films

Broken or angular particles: not more than 3% (counted in accordance with B.S. 6088)

Air inclusions: not more than 10% of the grains contain air inclusions which are larger than 25% of their area when viewed under a microscope in a liquid having a refractive index of 1.5.

The particle jet is blasted onto the steel sheet 2 from a nozzle having a size of 12.7 mm from a distance of 100 mm with a pressure of 2.5 bar. The nozzle is moved back and forth in the axial direction of a bending cylinder with a velocity of 10 m/min. A strip of width 10 mm is in all cases blasted by the particle jet. After every passage, the circumferential surface of the bending cylinder is rotated by 10 mm. This procedure is continued until the entire external surface of the steel sheet has been blasted with the sand jet.

As a result of the blasting with the sand jet, the sand particles impinge on, and slightly into, the surface of the steel sheet 2 and thus increase the surface measurement of the outside of the steel sheet 2 compared with the surface measurement of the inside of the steel sheet 2. The steel sheet 2 therefore retains very precisely the shape which it has acquired on the bending cylinder.

Figure 3:
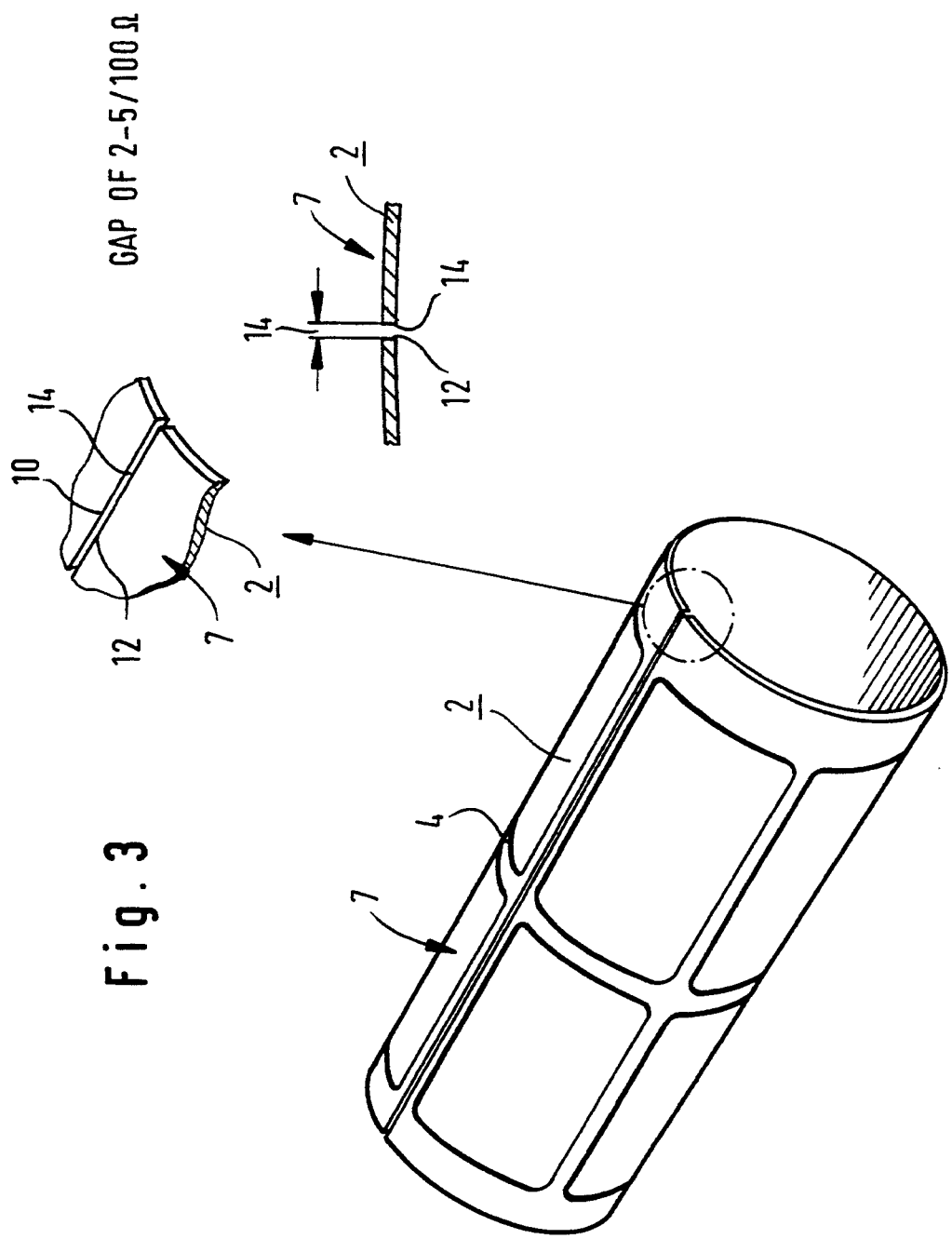
FIG. 3 shows the sleeve removed from the cylinder as shown in FIG. 2.

Once all this has happened, the sleeve 7 formed from the steel sheet 2 is pulled off the bending cylinder, in which process it retains its shape, as is shown in FIG. 3.

Figure 4:
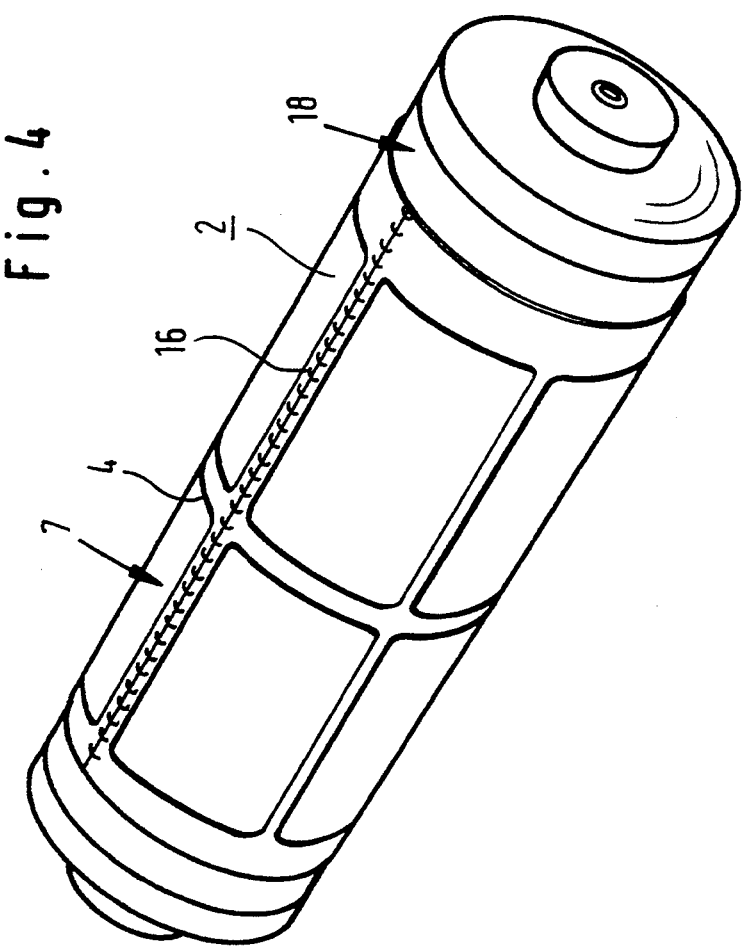
FIG. 4 shows the sleeve as shown in FIG. 3 after its mutually facing edges have been welded and after it has been mounted as a press fit on a supporting roller.
Figure 5:
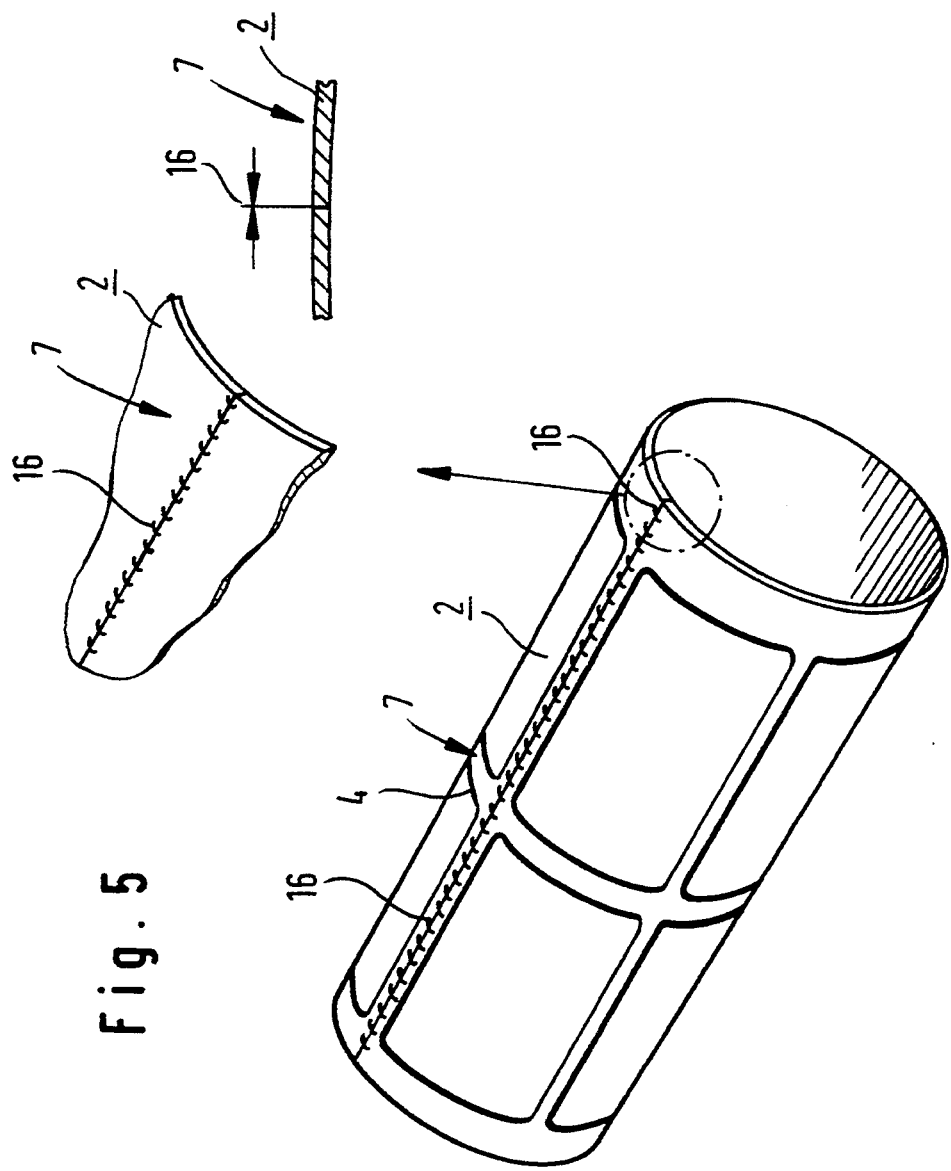
FIG. 5 shows the sleeve as shown in FIG. 4 after its facing edges have been welded.

Then the sleeve 7 shown in FIG. 3 bent from the steel sheet 2 is pushed onto a hardened unmagnetized steel cylinder which has the same radius as the bending cylinder. This may already be a supporting roller 18 (FIG. 4) in a punching machine. On this cylinder or on the supporting roller 18, the mutually facing edges of the steel sheet 2 bent to form a sleeve are welded together. Finally, the sleeve 7, which is consequently now finished, is pulled off the cylinder or the supporting roller 18 (welding seam 16) and is ready for use.

FIG. 6 shows a sleeve 107 whose punching bridges 104 are circular and are so arranged that it is advantageous to curve the mutually facing edges 110, 112 of the sleeve 107 in a wave like manner.

FIG. 7 shows a sleeve 207 whose punching bridges 204 are also circular but are so arranged that the mutually facing edges 210, 212 have a wave form whose half wave lengths are curved by more than 180°.

FIG. 8 shows a sleeve 307 in which the punching bridges 304 are rectangular and are so arranged that it is advantageous to arrange for the mutually facing edges 310, 312 of the sleeve to meander.

FIG. 9 shows a cylinder 108 which is magnetized with alternating poles only along an axial strip because this is sufficient to pull the edge regions of the mutually facing edges 410, 412 of the sleeve 407 situated on the cylinder 108 tightly onto the cylinder.

FIG. 9a shows the polarization of the magnets 125 from which the strip 133 is formed. Adjacent magnets 125 are always of the same polarity and separated from one another by spacers 127.

The end faces 109 and 111 of the cylinder 108 are adjoined by bearing journals 113, 115 on which slit raceways 117, 119 are to be mounted with screws which are not shown. The raceways 117, 119 have circumferential surfaces 121, 123 which axially adjoin the cylinder 108 and which project somewhat, for example 1/100 mm, over the punching bridges 404 of the sleeve 407. In some cases one raceway 117 or 119 is sufficient.

Figure 10:
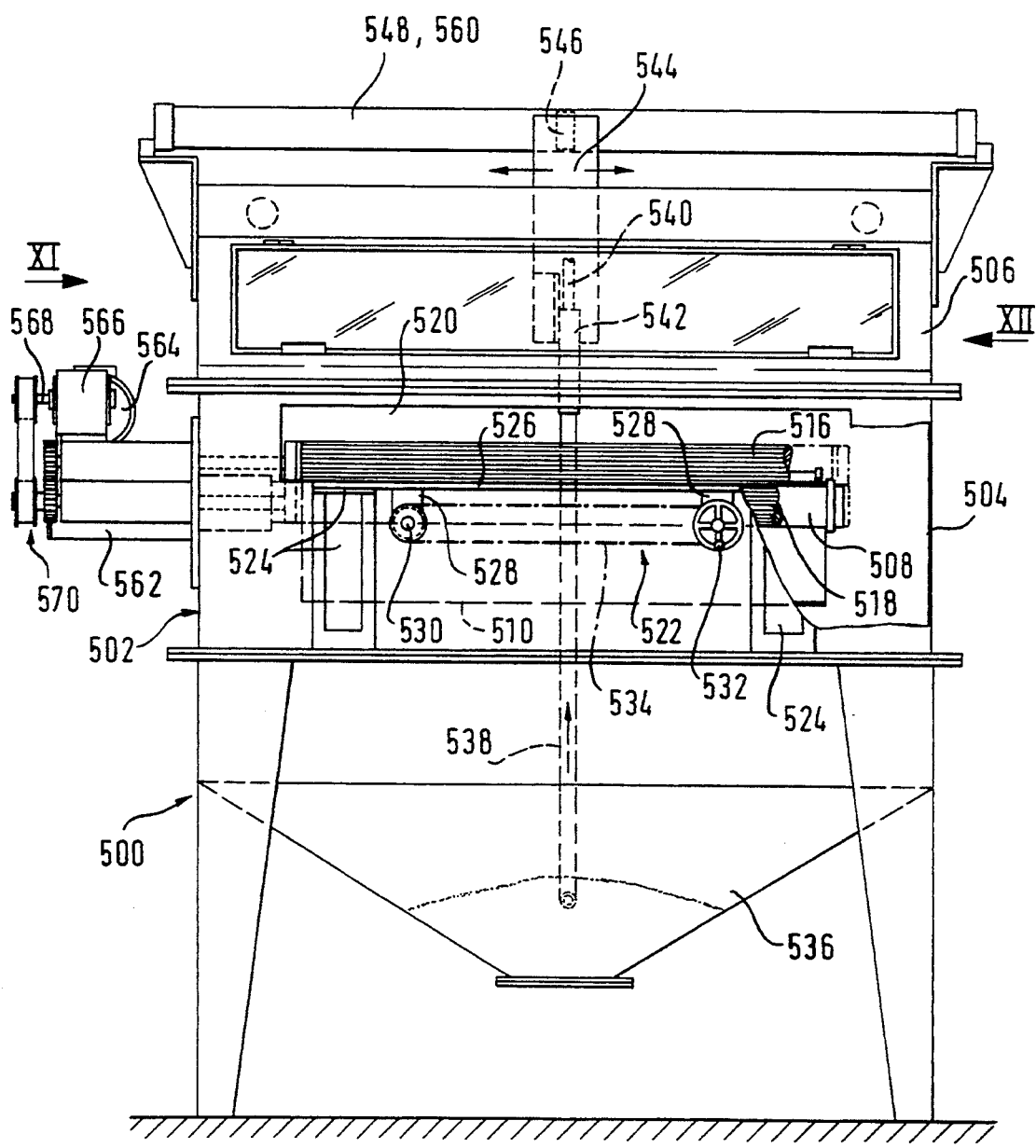
FIG. 10 shows an appliance for producing the sleeves in front view, partially in section.
Figure 11:
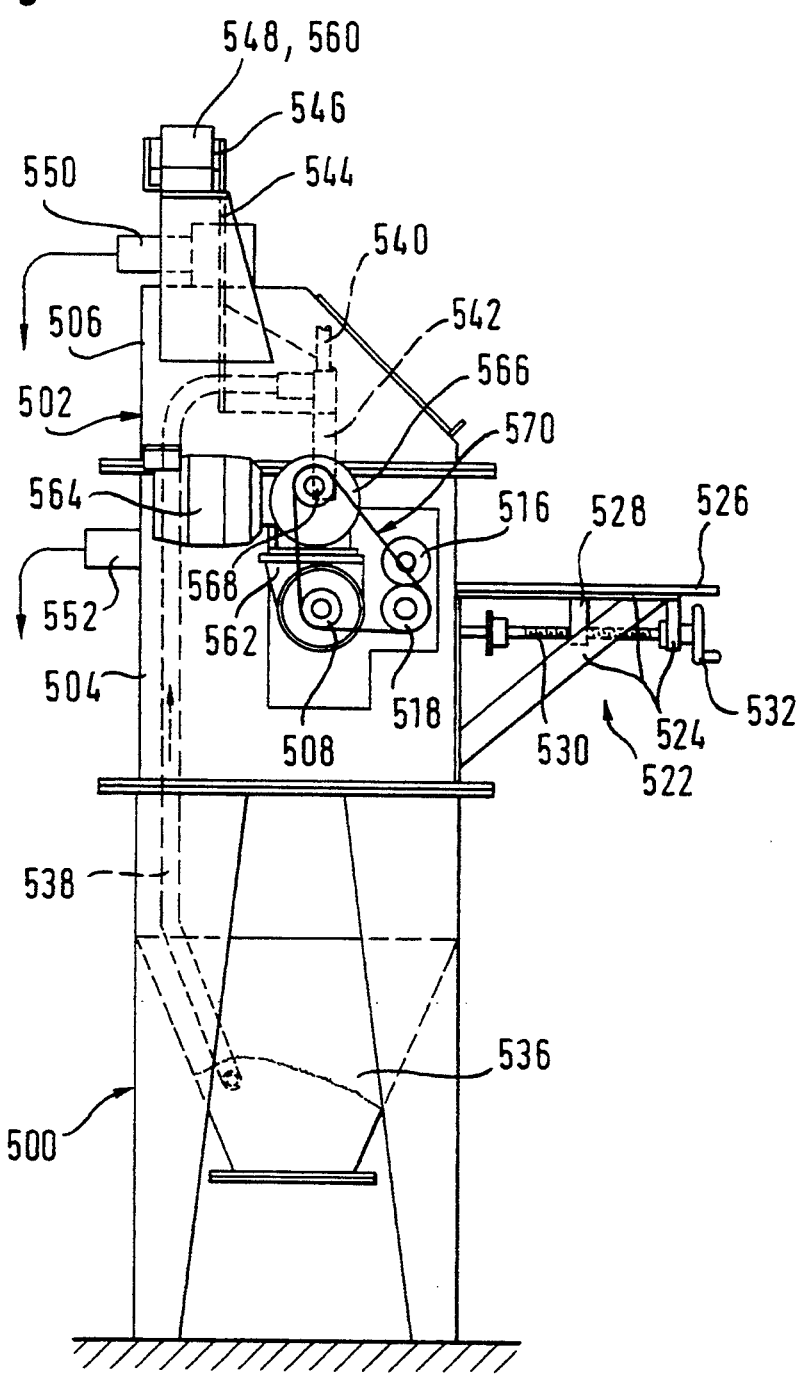
FIG. 11 shows the appliance shown in FIG. 10 in the viewing direction XII in FIG. 10.
Figure 12:
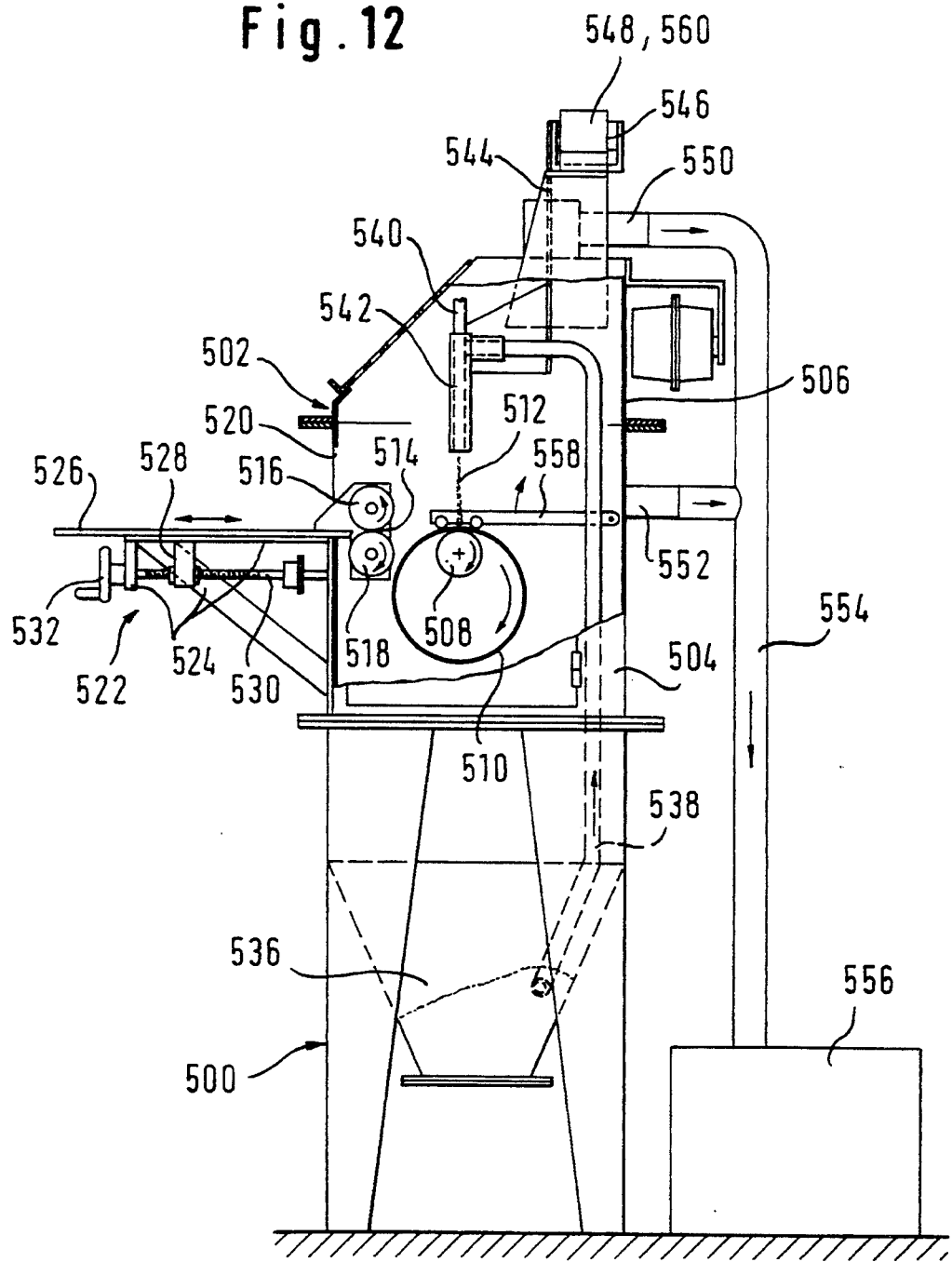
FIG. 12 shows the appliance as shown in FIG. 10 in the viewing direction XII in FIG. 10.

The appliance shown in FIGS. 10 to 12 has a frame 500 onto which a housing 502 comprising a lower section 504 and an upper section 506 is flanged.

Rotatably mounted in the housing is a driving roller 508, which has to be driven, in order to rotate a replaceable backing cylinder 510. A flat steel sheet which is not shown and is provided with the punching bridges and which is to be curvet into a sleeve is to be pushed over the backing cylinder 510 in FIG. 12 from the left. A particle jet 512 which moves back and forth in the axial direction of the backing cylinder 510 is blasted from above essentially radially to the backing cylinder 510 onto the steel sheet in the housing 502. To feed the steel sheet to the top of the backing cylinder 510, there is a feed clamping line 514 between two feed rollers 516, 518 driven synchronously with the backing cylinder 510, i.e. the driving roller 508 in the housing 502 next to the top of the backing cylinder 510.

At the level of the feed clamping line 514 and above it, the housing 502 has a feed opening 520 for the steel sheet, into which opening the steel sheet is to be fed by means of a conveying device 522 arranged on the housing 502 outside the housing 502. In this exemplary embodiment, the conveying device 522 comprises a table leaf 526 which is mounted on external struts 524 and has two downwardly directed running-nut attachments 528 which embrace running spindles 530 mounted on the struts and on the housing. One of these running spindles 530 is to be driven with a hand crank 532. Both running spindles 530 are connected to each other by a chain drive 534.

The housing 502 has a collecting chamber 536 for the particles of the particle jet 512, from which collecting chamber a suction line 538 for the particles originates. The suction line 538 opens into a nozzle 542 which is to be supplied with compressed air through a line 540, which can be moved back and forth in the axial direction of the backing cylinder 510 and which produces the particle jet 512. The nozzle 542 is moved back and forth as a result of the nozzle 502 being mounted on a support 544 which is in turn attached to a piston 546 which can be pushed back and forth in a cylinder 548. From the top of the housing section 506 and from the back of the housing section 504 there are led suction lines 550 and 552 which terminate via a manifold 554 in a suction appliance 556 which is provided with a dust filter and is not shown in more detail.

Arranged above the backing cylinder 510, there is arranged a hold-down device 558 which can be lowered and raised in the housing 502 for pressing the steel sheet against the top of the backing cylinder 510.

To drive the piston 546 and consequently to move the nozzle 542 back and forth, there is a motor 560 on the top of the housing 502.

To drive the feed rollers 516, 518 and the driving roller 508, there is, on a support 562, on the left-hand side of the housing 502 as seen in FIG. 10 a motor 564 with a 90° off-set gearbox 566 whose output shaft 568 effects the said drive via a belt pulley drive 570.

What is claimed is:

1. A method of producing a stamp plate comprising the steps of:
   a) bending a plane sheet of steel to form a shell around a cylindrical plate which is provided, at least section-wise, with a magnetized circumferential area and having essentially the same radius as a carrier roll, said shell having an inner and outer surface and capable of being arranged snugly on said carrier roll;
   b) providing said outer surface of said shell with a stamp cross ridge preferably sharpened in a knife-like manner by etching of said plane steel sheet;
   c) connecting mutually facing edges of said shell together; and
   d) treating said outer surface of the shell so that the outer surface measurements of said shell are increased relative to the inner surface measurements of said shell.

2. A method according to claim 1, wherein the steel sheet exhibits the quality C 67 according to DIN 17222/1544P.

3. A method according to claim 1, wherein the thickness of the steel sheet is 0.35 to 1.2 mm.

4. A method according to claim 3, wherein the thickness of the steel sheet is 0.4 to 1.1 mm.

5. A method according to claim 1, wherein the shell encircles the cylindrical plate with the exception of a 0.02 to 0.05 mm gap between the mutually facing edges.

6. A method according to claim 1, wherein a particle beam treatment is used as said treatment of step d).

7. A method according to claim 6, wherein sandblasting is used as said particle beam treatment.

8. A method according to claim 1, wherein the mutually facing edges of the shell are welded together, at least at their ends.

9. A method according to claim 8, wherein the mutually facing edges of the shell are butt welded with an external welding seam.

10. A method according to claim 1, wherein the mutually facing edges of the shell are curved in conformity with the shape of the stamp cross ridge.

11. A method according to claim 1, wherein the cylindrical plate is magnetized on its circumferential area only along an axial line.

12. A method according to claim 1, wherein front ends of the cylindrical plate gradually transform into journal shafts, and a barrel ring with a circumferential area projecting somewhat over the stamp cross ridge is mounted on the inside end of at least one journal shaft.

13. A method according to claim 1, wherein said cylindrical plate is a replaceable hollow support cylinder which rotates in a housing on a revolving drive roll, said method further comprising bending said plane sheet by pushing the plane sheet over said replaceable hollow support cylinder.

14. A method according to claim 13, wherein a particle beam treatment is used as said treatment of step d).

15. A method according to claim 14, wherein said particle beam treatment is carried out by blowing the particle beam downward axially along the replaceable hollow support cylinder against said steel sheet.

16. A method according to claim 14, wherein sandblasting is used as said particle beam treatment.

17. A method of making a sleeve adapted to punch sheet-type material, wherein said sleeve is bent from a flat steel sheet and is snugly fitted on a supporting roller, and wherein the outer surface of said sleeve is provided with punching bridges formed by etching the steel sheet, said method comprising the steps of:
 a) pushing a flat steel sheet from one side of a replaceable backing cylinder rotating in a housing, over said replaceable backing cylinder so that said steel sheet is bent around said replaceable backing cylinder, wherein said replaceable backing cylinder has substantially the same radius as a supporting roller which supports said replaceable backing cylinder;
 b) blasting essentially radially a particle jet onto said steel sheet during bending by moving said particle jet back and forth in the axial direction of the backing cylinder; and
 c) interconnecting mutually facing edges of the thus formed bent steel sheet on said supporting roller or on a cylinder having substantially the same radius as said supporting roller thereby forming a sleeve.

18. The method of claim 17, wherein said sleeve is adapted to punch label material.

19. The method of claim 17, wherein said punching bridges on the outer surface of said sleeve are sharpened in a knife-like fashion.

* * * * *